(12) United States Patent
Sadamitsu

(10) Patent No.: US 10,910,894 B2
(45) Date of Patent: Feb. 2, 2021

(54) ROTOR

(71) Applicant: TOYOTA JIDOSHA KABUSHIKI KAISHA, Toyota (JP)

(72) Inventor: Takahiro Sadamitsu, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 35 days.

(21) Appl. No.: 16/396,842

(22) Filed: Apr. 29, 2019

(65) Prior Publication Data

US 2019/0356184 A1  Nov. 21, 2019

(30) Foreign Application Priority Data

May 15, 2018 (JP) ................................ 2018-093892

(51) Int. Cl.
*H02K 1/28* (2006.01)
*H02K 1/27* (2006.01)
*F02B 39/10* (2006.01)

(52) U.S. Cl.
CPC ............. *H02K 1/2726* (2013.01); *H02K 1/28* (2013.01); *F02B 39/10* (2013.01)

(58) Field of Classification Search
CPC ........ H02K 1/2713; H02K 1/28; H02K 1/243; H02K 1/2726
See application file for complete search history.

(56) References Cited

U.S. PATENT DOCUMENTS

| | | | | |
|---|---|---|---|---|
| 5,233,248 A * | 8/1993 | Kawamura | ............ | H02K 1/185 310/156.25 |
| 6,229,239 B1 * | 5/2001 | Lucidarme | ........... | H02K 21/046 310/162 |
| 8,482,178 B2 * | 7/2013 | Okitsu | ................... | H02K 1/278 310/156.27 |
| 8,723,383 B2 * | 5/2014 | Blanc | ................... | H02K 1/2773 310/156.22 |
| 9,407,115 B2 * | 8/2016 | Marvin | .................... | H02K 1/28 |

FOREIGN PATENT DOCUMENTS

| | | |
|---|---|---|
| JP | 2010-200456 A | 9/2010 |
| JP | 2011-041371 A | 2/2011 |
| JP | 2015-091202 A | 5/2015 |

* cited by examiner

*Primary Examiner* — Dang D Le
(74) *Attorney, Agent, or Firm* — Sughrue Mion, PLLC

(57) ABSTRACT

Provided is a rotor that is long in the axial direction of the rotary shaft without increasing the ratio L/D between the length L and the inner diameter D of the permanent magnet. The permanent magnet of the rotor includes a plurality of sub-magnets that are divided in the axial direction A of the rotary shaft. The armor ring includes a plurality of sub-rings that are divided in the axial direction A. The connector is disposed on the inner periphery of a connecting part between the two sub-rings and that are adjacent in the axial direction A and is disposed between the two sub-magnets that are adjacent in the axial direction A. The sub-magnets each have a recess that is depressed in the axial direction A. The connector has protrusions that fit to the recesses of the magnet.

2 Claims, 3 Drawing Sheets

ROTOR

CROSS REFERENCE TO RELATED APPLICATIONS

The present application claims priority from Japanese patent application JP 2018-093892 filed on May 15, 2018, the content of which is hereby incorporated by reference into this application.

BACKGROUND

Technical Field

The present disclosure relates to a rotor for an air compressor or an electric motor.

Background Art

Conventionally inventions about a motor rotor suitable for an electric motor to be assembled into an electric supercharger have been known (see JP 2010-200456 A). The motor rotor described in JP 2010-200456 A has the following feature. The motor rotor includes a sleeve, a permanent magnet, a first end ring, a second end ring and an armor ring.

The sleeve has a first end face and a second end face that define both end faces in the axial direction, and has a cylindrical shape like a sleeve that surrounds a rotary shaft around the axis. The sleeve includes an oil slinger that axially extends from the first end face to a predetermined position toward the second end face, and an inner sleeve that integrally connects to the oil slinger and axially extends to the second end face.

The permanent magnet surrounds the inner sleeve around the axis. The first end ring surrounds the inner sleeve around the axis and abuts one end face of the permanent magnet close to the first end face. The second end ring surrounds the inner sleeve around the axis and abuts the other end face of the permanent magnet. The armor ring is a hollow cylindrical member that surrounds these permanent magnet, first end ring and second end ring while tightening them around the axis.

The inner face of the oil slinger of the sleeve is in contact with the rotary shaft to fit to the rotary shaft concentrically. The inner diameter of the inner sleeve of the sleeve is larger than the inner diameter of the oil slinger from a position closer to the first end face than the first-end side end face of the first end ring to the second end face.

This configuration increases the inner diameter of the inner sleeve at a part associated with the permanent magnet and the pair of end rings by the amount of expected deformation. This can omit the step after assembly of the motor rotor to trim the inner wall of the inner sleeve for finish machining, and accordingly can reduce the manufacturing cost. The oil slinger and the inner sleeve as one unit can reduce the number of components, and so can relax the geometric tolerance and can reduce the cost (see JP 2010-200456 A, claim 1 and paragraphs 0012 to 0013, for example).

SUMMARY

In some cases, a compressor in an electric supercharger is required to have a high-pressure ratio and a high flow rate. In such a case, the motor rotor has to be long along the rotary shaft to increase the output from the electric motor. The conventional motor rotor as stated above, however, has a problem that an increase in length along the rotary shaft means an increase in the length of the armor ring and an increase in the ratio L/D between the length L and the inner diameter D of the permanent magnet, and such a permanent magnet is hard to produce. The length of the motor rotor is therefore limited, and it is hard for the electric motor to increase the output.

The present disclosure provides a rotor that is long along the axial direction of the rotary shaft without increasing the ratio L/D between the length L and the inner diameter D of the permanent magnet.

A rotor according to one aspect of the present disclosure includes: a rotary shaft; a permanent magnet disposed around the rotary shaft; and an armor ring disposed around the permanent magnet. The permanent magnet includes a plurality of sub-magnets in the axial direction of the rotary shaft. The armor ring includes a plurality of sub-rings in the axial direction. The rotor further includes a connector disposed on the inner periphery of a connecting part between the two adjacent sub-rings along the axial direction and disposed between the two adjacent sub-magnets along the axial direction. Each sub-magnet has a protrusion that protrudes in the axial direction or a recess that is depressed in the axial direction and the connector has a recess that fits to the protrusion of the sub-magnet or a protrusion that fits to the recess of the sub-magnet.

According to this aspect, the permanent magnet includes a plurality of sub-magnets that is divided in the axial direction of the rotary shaft. Such a plurality of sub-magnets along the axial direction of the rotary shaft increases the length of the rotor without increasing the ratio L/D between the length L and the inner diameter D of the sub-magnets by increasing division number of the permanent magnet. This facilitates the manufacturing of the permanent magnet, and the rotor has a length required to increase the output from the rotor and accordingly the output from the electric motor increases. This can fulfill the request for a high-pressure ratio and a high flow rate of a compressor in an electric supercharger, for example.

The connector intervenes between the two sub-magnets that are disposed adjacent to each other in the axial direction of the rotary shaft so that each protrusion of the sub-magnet fits to the corresponding recess of the connector or so that each recess of the sub-magnet fits to the corresponding protrusion of the connector. This enables positioning to specify the positional relationship around the axis of the rotary shaft between the two adjacent sub-magnets via the connector in the axial direction of the rotary shaft, and directs the easy-direction of magnetization of these two sub-magnets in the same direction.

In the rotor as stated above, the rotor has a first length where the protrusion of each sub-magnet and the corresponding recess of the connector or the recess of each sub-magnet and the corresponding protrusion of the connector overlap and a second length where each sub-ring and the outer periphery of the connector overlap in the axial direction, and the first length is longer than the second length.

Due to this configuration, the protrusion of the sub-magnet is firstly allowed to fit to the corresponding recess of the connector or the protrusion of the connector is firstly allowed to fit to the corresponding recess of the sub-magnet to connect the two sub-magnets to be adjacent in the axial direction of the rotary shaft via the connector. Next, while mutually fitting the connector and the sub-magnets, ends of two adjacent sub-rings along the axial direction of the rotary shaft are connected on the outer periphery of the connector, so as to define the connecting part of the ends of the two sub-rings on the outer periphery of the connector. This facilitates the manufacturing of the rotor.

The above aspect of the present disclosure provides a rotor that is long along the axial direction of the rotary shaft without increasing the ratio L/D between the length L and the inner diameter D of the permanent magnet.

DETAILED DESCRIPTION

The following describes a rotor according to one embodiment of the present disclosure, with reference to the drawings.

Figure 1:
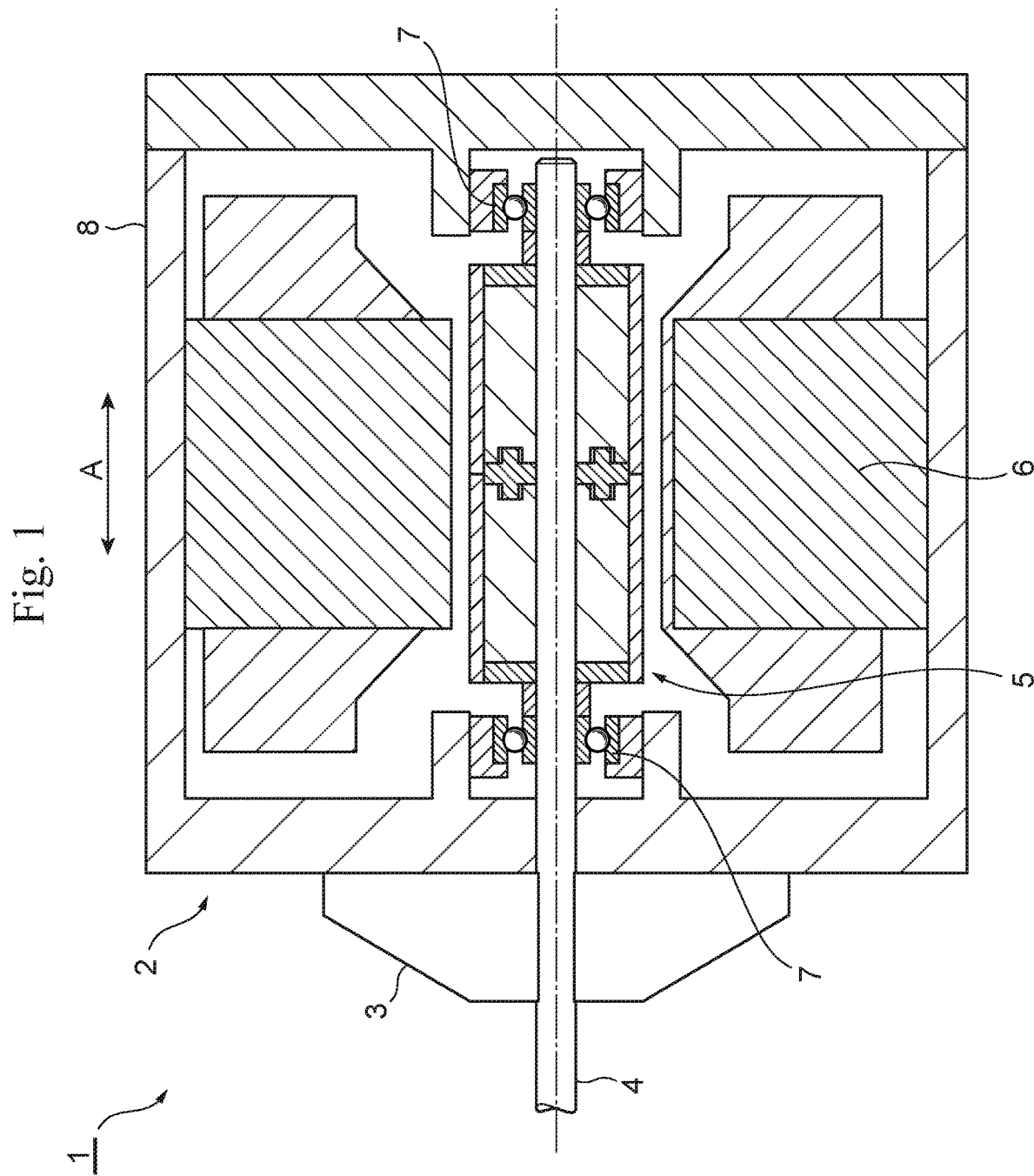
FIG. 1 is a schematic cross-sectional view of an air compressor including a rotor according to one embodiment of the present disclosure.

FIG. 1 is a schematic cross-sectional view of an air compressor 1 including a rotor 5 according to the present embodiment. The air compressor 1 includes an electric motor 2 and an impeller 3. The electric motor 2 includes a rotary shaft 4, a rotor 5, a stator 6, a bearing 7 and a casing 8. The impeller 3 is disposed at an end of the rotary shaft 4 that protrudes to the outside of the casing 8. Rotation of the impeller 3 with the rotary shaft 4 increases the air pressure. The air compressor 1 may be a part of an electric supercharger as described in JP 2010-200456 A as stated above.

The rotary shaft 4 has an impeller 3-side end and the other end on the other side of the impeller 3 that are rotatably supported by a pair of bearings 7 within the casing 8. In one example, the rotor 5 is fixed to the outer periphery of the rotary shaft 4 between the pair of bearings 7, and receives a rotative force from the stator 6 to rotate the rotary shaft 4. The stator 6 is stored in the casing 8 and is fixed to the casing 8. The bearings 7 are supported by the casing 8 and rotatably support the rotary shaft 4. The casing 8 stores the rotor 5, the stator 6 and the bearing 7, and supports them.

Figure 2:
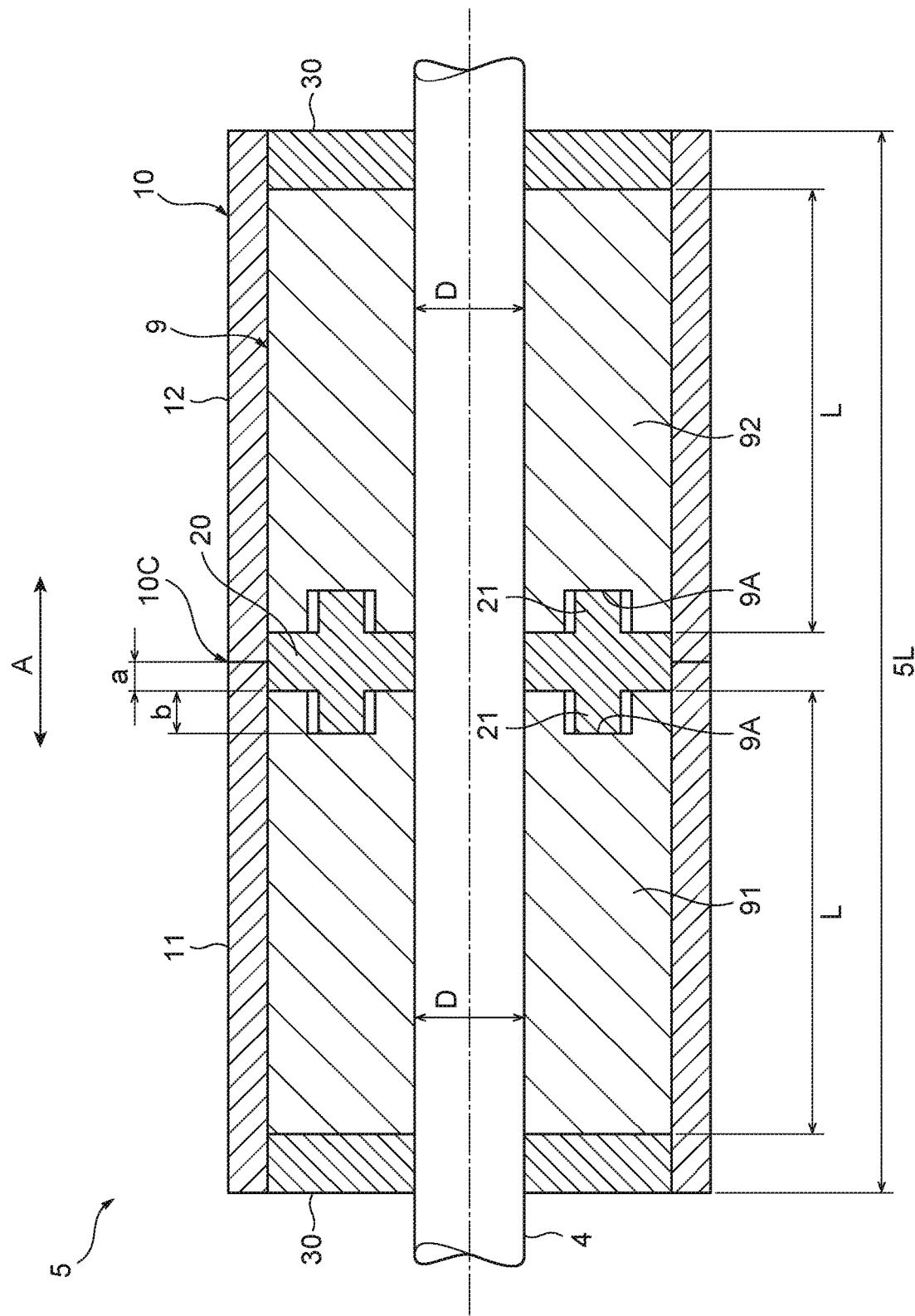
FIG. 2 is a schematic enlarged cross-sectional view of the rotor in FIG. 1.

FIG. 2 is a schematic enlarged cross-sectional view of the rotor 5 in FIG. 1. Although the details are described later, the rotor 5 of the present embodiment has the following feature.

The rotor 5 includes the rotary shaft 4, the permanent magnet 9 disposed around the rotary shaft 4, the armor ring 10 disposed around the permanent magnet 9, and a connector 20. The permanent magnet 9 includes a plurality of sub-magnets 91 and 92 that are divided in the axial direction A of the rotary shaft 4. The armor ring 10 includes a plurality of sub-rings 11 and 12 that are divided in the axial direction A. The connector 20 is disposed on the inner periphery of a connecting part 10C between the two sub-rings 11 and 12 that are adjacent in the axial direction A, and is disposed between the two sub-magnets 91 and 92 that are adjacent in the axial direction A. The sub-magnets 91 and 92 each have a recess 9A that is depressed in the axial direction A. The connector 20 has protrusions 21 that fit to the recesses 9A of the magnet. Note here that the sub-magnets 91 and 92 may each have a protrusion that protrudes in the axial direction A, and the connector 20 may have recesses that fit to the protrusions of the magnet.

The following describes various parts of the rotor 5 of the present embodiment in more details. The rotor 5 of the present embodiment includes a pair of end plates 30 in addition to the rotary shaft 4, the permanent magnet 9, the armor ring 10, and the connector 20 as stated above.

The permanent magnet 9 has a cylindrical shape that has a through hole for penetration of the rotary shaft 4 and is concentric with the rotary shaft 4. The permanent magnet 9 is disposed around the rotary shaft 4 so as to surround the outer periphery of the rotary shaft 4, and extends along the axial direction A of the rotary shaft 4 between the pair of bearings 7. The cylindrical permanent magnet 9 is fixed to the outer periphery of the rotary shaft 4 by interference fit, for example. In another example, the permanent magnet 9 may include a plurality of parts that are divided in the circumferential direction of the rotary shaft 4.

The permanent magnet 9 includes the plurality of sub-magnets 91 and 92 that are divided in the axial direction A of the rotary shaft 4. As shown in FIG. 2 as one example, the permanent magnet 9 includes the first sub-magnet 91 and the second sub-magnet 92 that are divided into two in the axial direction A of the rotary shaft 4. In another example, the permanent magnet 9 may include three or more sub-magnets that are divided in the axial direction A of the rotary shaft 4.

In the example of FIG. 2, the sub-magnets 91 and 92 each have a recess 9A that is depressed in the axial direction A of the rotary shaft 4. These recesses 9A are depressed on the faces of the sub-magnets 91 and 92 that are opposed to the connector 20. The sub-magnets 91 and 92 each have such recesses 9A at a plurality of positions in the circumferential direction of the rotary shaft 4. In the axial direction A of the rotary shaft 4, the depth of these recesses 9A is substantially equal to the height of the protrusions 21 of the connector 20. In the radial direction of the rotary shaft 4, the inner diameter of these recesses 9A has a positive dimensional tolerance relative to the outer diameter of the protrusions 21 of the connector 20, for example.

Figure 3:
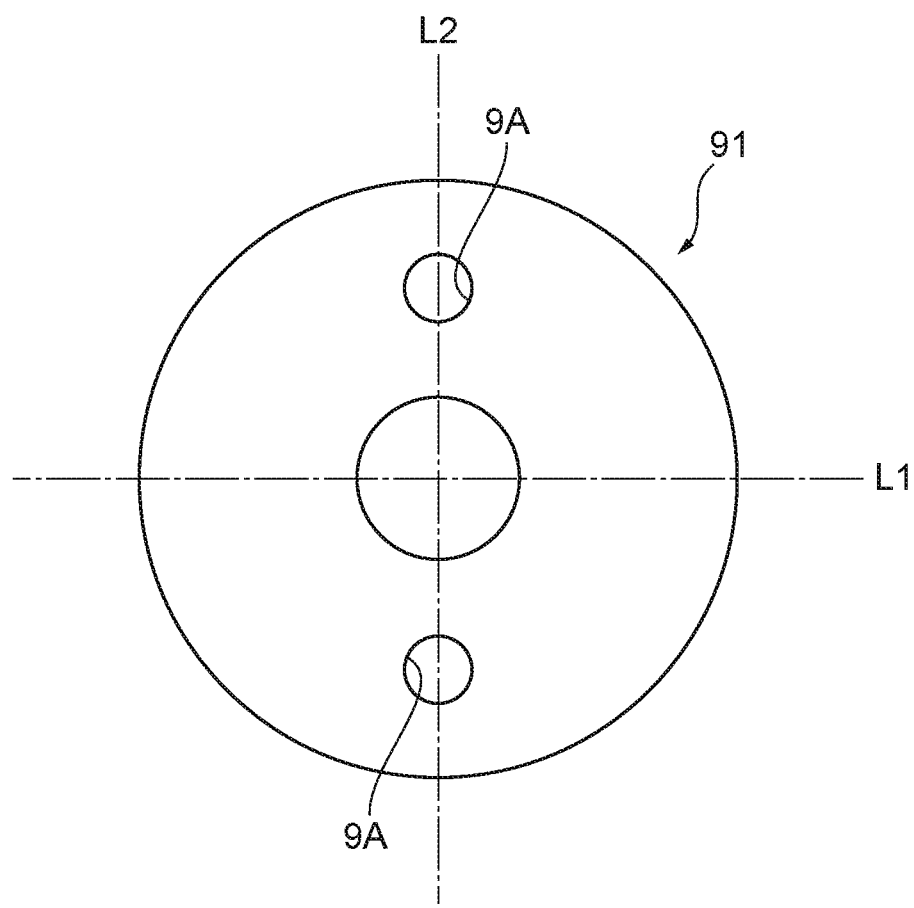
FIG. 3 is an end view of a sub-magnet of the rotor in FIG. 2 viewed from the axial direction of the rotary shaft.

FIG. 3 is an end view of the sub-magnet 91, showing the end face of the sub-magnet 91 of the rotor 5 in FIG. 2 that is opposed to the connector 20 viewed from the axial direction A of the rotary shaft 4. In the example of FIG. 3, the sub-magnet 91 has a plurality of recesses 9A. Specifically, the sub-magnet 91 has two recesses 9A with the angular interval of 180° in the circumferential direction. More specifically, in the example of FIG. 3, the sub-magnet 91 has the S-pole on one end and the N-pole on the other end along a first center line L1 that is perpendicular to the axial direction A of the rotary shaft 4. In this case, the recesses 9A may be disposed on a second center line L2 that is orthogonal to the first center line L1 and the axial direction A of the rotary shaft 4.

The number of the recesses 9A is not limited to two, which may be one or three or more. These plurality of recesses 9A may be disposed having equal angular intervals in the circumferential direction on the end face of the sub-magnet 91 that is opposed to the connector 20. In the example of FIG. 3, the recesses 9A have a round shape viewed from the axial direction A of the rotary shaft 4, which may be a polygonal shape or any other shapes.

Although not shown, the connector 20 may have a recess instead of the protrusion 21 to fit to the recess 9A of the magnet. In this case, the sub-magnet 91 may have a protrusion to fit to the recess of the connector 20. In this case, the number, the disposition and the shape of the protrusions of the magnet viewed from the axial direction A of the rotary shaft 4 are similar to the number, the disposition and the shape of the recesses 9A of the magnet as stated above.

The armor ring 10 has a cylindrical or tubular shape that surrounds the outer periphery of the permanent magnet 9, and is disposed around the permanent magnet 9. The armor ring 10 extends along the axial direction A of the rotary shaft 4 between the pair of bearings 7. The armor ring 10 may be made of a non-magnetic material, such as non-magnetic stainless steel. The armor ring 10 may be fixed to the surrounding of the permanent magnet 9, the connector 20 and the end plates 30 by shrink fit, for example.

The armor ring 10 includes the plurality of sub-rings 11 and 12 that are divided in the axial direction A. In the example of FIG. 2, the armor ring 10 includes the first sub-ring 11 and the second sub-ring 12 that are divided into two in the axial direction A of the rotary shaft 4. In another example, the armor ring 10 may include three or more sub-rings that are divided in the axial direction A of the rotary shaft 4. In this case, the number of sub-rings of the armor ring 10 may be equal to the number of sub-magnets of the permanent magnet 9.

In one example, the connector 20 is a disk-like member having a through hole at the center for penetration of the rotary shaft 4. The connector 20 may be made of a non-magnetic material, such as non-magnetic stainless steel. The connector 20 may be fixed to the outer periphery of the rotary shaft 4 by interference fit, for example. The connector 20 is disposed on the inner periphery of the connecting part 10C between the two sub-rings 11 and 12 that are adjacent in the axial direction A, and is disposed between the two sub-magnets 91 and 92 that are adjacent in the axial direction A.

In the example of FIG. 2, the rotor 5 has length b where the recess 9A of the magnet and the protrusion 21 of the connector 20 overlap and length a where the sub-ring 11 and the outer periphery of the connector 20 overlap in the axial direction A of the rotary shaft 4. The length b is longer than the length a. A similar relationship holds for the second sub-magnet 92 as well that is adjacent to the first sub-magnet 91 via the connector 20. As described above, the sub-magnets 91 and 92 may have protrusions instead of the recesses 9A and the connector 20 may have recesses to fit to the protrusions. In this case, in the axial direction A of the rotary shaft 4, the length where the protrusion of the magnet and the recess of the connector 20 overlap is longer than the length a where the sub-ring 11 and the outer periphery of the connector 20 overlap.

In one example, each of the end plates 30 as a pair is a disk-like member having a through hole at the center for penetration of the rotary shaft 4. The end plates 30 may be made of a non-magnetic material, such as non-magnetic stainless steel. The end plates 30 may be fixed to the outer periphery of the rotary shaft 4 by interference fit, for example. These end plates 30 as a pair are disposed on both ends of the permanent magnet 9, which includes the plurality of sub-magnets 91 and 92, in the axial direction A of the rotary shaft 4. The sub-rings 11 and 12 are fixed to the outer periphery of these end plates 30 as a pair by shrink fit, for example.

The following describes advantageous effects of the rotor 5 of the present embodiment.

As stated above, the rotor 5 of the present embodiment includes the rotary shaft 4, the permanent magnet 9 disposed around the rotary shaft 4, the armor ring 10 disposed around the permanent magnet 9, and the connector 20. The permanent magnet 9 includes a plurality of sub-magnets 91 and 92 that are divided in the axial direction A of the rotary shaft 4. The armor ring 10 includes a plurality of sub-rings 11 and 12 that are divided in the axial direction A. The connector 20 is disposed on the inner periphery of the connecting part 10C between the two sub-rings 11 and 12 that are adjacent in the axial direction A, and is disposed between the two sub-magnets 91 and 92 that are adjacent in the axial direction A. The sub-magnets 91 and 92 each have a recess 9A that is depressed in the axial direction A. The connector 20 has protrusions 21 that fit to the recesses 9A of the magnet.

In this way, the rotor 5 of the present embodiment includes the permanent magnet 9 that are divided into the plurality of sub-magnets 91 and 92 in the axial direction A of the rotary shaft 4. Such a divided permanent magnet 9 in the axial direction A of the rotary shaft 4 increases the length 5L of the rotor 5 without increasing the ratio L/D between the length L and the inner diameter D of the sub-magnets 91 and 92. This facilitates the manufacturing of the permanent magnet 9, and the rotor 5 has a length 5L required to increase the output from the rotor 5 and accordingly the output from the electric motor 2 increases. This can fulfill the request for a high-pressure ratio and a high flow rate of an air compressor 1 in an electric supercharger, for example.

The connector 20 intervenes between the two sub-magnets 91 and 92 that are disposed adjacent to each other in the axial direction A of the rotary shaft 4 so that each recess 9A of the magnet fits to the corresponding protrusion 21 of the connector 20. This enables positioning to specify the positional relationship between the two adjacent sub-magnets 91 and 92 via the connector 20 in the axial direction A of the rotary shaft 4 around the axial of the rotary shaft 4, and directs the easy-direction of magnetization of these two sub-magnets 91 and 92 in the same direction.

As stated above, the sub-magnets 91 and 92 of the rotor 5 may have protrusions that protrude in the axial direction A instead of the recesses 9A and the connector 20 may have recesses to fit to the protrusions of the magnet instead of the protrusions 21. In this case also, fitting of the protrusions of the magnet to the recesses of the connector 20 achieves the same advantageous effect.

As stated above, the rotor 5 of the present embodiment has length b where the recess 9A and the protrusion 21 of the connector 20 overlap and length a where the sub-rings 11 and the outer periphery of the connector 20 overlap in the axial direction A of the rotary shaft 4. The length h is longer than the length a.

Due to this configuration, the protrusion 21 of the connector 20 is firstly allowed to fit to the corresponding recess 9A to connect the two sub-magnets 91 and 92 to be adjacent in the axial direction A of the rotary shaft 4 via the connector 20. Next, while mutually fitting the connector 20 and the sub-magnets 91 and 92, ends of two adjacent sub-rings 11 and 12 along the axial direction A of the rotary shaft 4 are connected on the outer periphery of the connector 20, so as to define the connecting part 10c of the ends of the two sub-rings 11 and 12 on the outer periphery of the connector 20. This directs the easy-direction of magnetization of these two sub-magnets 91 and 92 in the same direction, and so manufactures the rotor 5 easily.

As stated above, the sub-magnets 91 and 92 of the rotor 5 may have protrusions that protrude in the axial direction A instead of the recesses 9A and the connector 20 may have recesses to fit to the protrusions of the magnet instead of the protrusions 21. This case also achieves the same advantageous effect. Specifically the length of a part where the protrusion of the sub-rings 11 and the corresponding recess of the connector 20 overlap is longer than the length a of a part where the sub-magnet 91 and the outer periphery of the connector 20 overlap.

Due to this configuration, the protrusion of the magnet is firstly allowed to fit to the corresponding recess of the connector 20. Next, while mutually fitting the connector 20 and the sub-magnets 91 and 92, ends of two adjacent sub-rings 11 and 12 along the axial direction A of the rotary shaft 4 are connected on the outer periphery of the connector 20, so as to define the connecting part 10c of the ends of the two sub-rings 11 and 12 on the outer periphery of the connector 20. This directs the easy-direction of magnetization of these two sub-magnets 91 and 92 in the same direction, and so manufactures the rotor 5 easily.

That is a detailed description of the embodiments of the present disclosure with reference to the drawings. The specific configuration of the present disclosure is not limited to the above-stated embodiment, and the design may be modified variously without departing from the spirits of the present disclosure. The present disclosure also covers such modified embodiments.

DESCRIPTION OF SYMBOLS

4 Rotary shaft
5 Rotor
9 Permanent magnet
9A Recess of magnet
91 Sub-magnet
92 Sub-magnet
10 Armor ring
10C Connecting part
11 Sub-ring
12 Sub-ring
20 Connector
21 Protrusion
A Axial direction
a Length of a part where a sub-ring and outer periphery of connector overlap
b Length of a part where a recess of magnet and a protrusion of connector overlap.

What is claimed is:

1. A rotor comprising: a rotary shaft; a permanent magnet disposed around the rotary shaft; and an armor ring disposed around the permanent magnet;
   the permanent magnet includes a plurality of sub-magnets in the axial direction of the rotary shaft,
   the armor ring includes a plurality of sub-rings in the axial direction,
   the rotor further includes a connector disposed on the inner periphery of a connecting part between the two adjacent sub-rings along the axial direction and disposed between the two adjacent sub-magnets along the axial direction, and
   each sub-magnet has a protrusion that protrudes in the axial direction or a recess that is depressed in the axial direction and the connector has a recess that fits to the protrusion of the sub-magnet or a protrusion that fits to the recess of the sub-magnet.

2. The rotor according to claim 1, wherein the rotor has a first length where the protrusion of each sub-magnet and the corresponding recess of the connector or the recess of each sub-magnet and the corresponding protrusion of the connector overlap and a second length where each sub-ring and the outer periphery of the connector overlap in the axial direction, and the first length is longer than the second length.

* * * * *